United States Patent [19]

Ziolkowski et al.

[11] Patent Number: 4,476,553
[45] Date of Patent: Oct. 9, 1984

[54] METHOD OF DETERMINING THE SIGNATURES OF ARRAYS OF MARINE SEISMIC SOURCES

[75] Inventors: Antoni M. Ziolkowski, Twickenham; Leslie Hatton, New Malden; Gregory E. Parkes, Guildford, all of England; Tor-Arvid Haugland, Rukkin, Norway

[73] Assignee: The British National Oil Corporation, Great Britain

[21] Appl. No.: 381,856

[22] Filed: May 25, 1982

[30] Foreign Application Priority Data

May 29, 1981 [GB] United Kingdom ................ 8116527

[51] Int. Cl.³ ............................ G01J 1/38; G01J 1/13
[52] U.S. Cl. ...................... 367/144; 367/15; 367/23; 181/110; 181/118; 181/120
[58] Field of Search ...................... 367/21, 22, 23, 41, 367/46, 144, 15; 181/110, 118, 120

[56] References Cited

U.S. PATENT DOCUMENTS

| | | | |
|---|---|---|---|
| 3,866,161 | 2/1975 | Barr et al. | 367/21 |
| 3,893,539 | 7/1975 | Mott-Smith | 181/111 |
| 4,168,484 | 9/1979 | Wright | 367/21 |

OTHER PUBLICATIONS

French et al, "Signature Measurement . . . Seismic Surface", 1978, pp. 631-638, OTC, vol. 2, Paper 3124.
Lauhaff et al, "Maintaining . . . Tuned Source Array", pp. 441-448, 5/5/77, OTC, vol. 1.
Newman et al, "Theory . . . Seismic Exploration", 1977, 47th Ann. Mtg., Calgory, Canada.
Ziolkowski, "A Method . . . Air Gun", 1970, pp. 137-161, Geophys. J. R. Astr. Soc., vol. 21.

*Primary Examiner*—Nelson Moskowitz
*Attorney, Agent, or Firm*—Lerner, David, Littenberg, Krumholz & Mentlik

[57] ABSTRACT

In order to determine the signature of an array of n seismic sources 21 to 27, for instance marine seismic sources in the form of air guns, the array is actuated and the emitted pressure wave is measured at n independent points whose positions will respect to the array are known by hydrophones 31 to 37. The measurements are processed to produce n equivalent signatures of the n sources taking into account the interactions therebetween. The signature of the array is then determined merely by superposing the n equivalent signatures.

32 Claims, 6 Drawing Figures

METHOD OF DETERMINING THE SIGNATURES OF ARRAYS OF MARINE SEISMIC SOURCES

The present invention relates to a method of determining the signature of an array of marine seismic sources.

Marine seismic sources are commonly used in groups or arrays in order to produce a combined source which has more desirable characteristics than the individual "point sources" of which the array is composed. Various features of such arrays present special problems for the geophysicist.

A first such feature is that any aroustic or seismic array transmits a sound wave which is directional. That is, the shape of the transmitted wave, or the signature, varies with the direction. This is a consequence of the array having dimensions which are not small compared with the wavelengths of sound present in the transmitted wave. This is in marked contrast to the elements of the array which are normally very small compared with these wavelengths, and therefore, behave individually like "point sources", i.e. the wave transmitted by any individual element has spherical symmetry and is the same shape in all directions. A major problem with marine seismic source arrays is to determine the signature as a function of direction.

A second such feature of arrays, illustrated in FIG. 1 of the accompanying drawings, is that the signature varies with the distance from the array. This is, in a fiven direction, such as that indicated by arrows 1 and 2, the signature varies with increasing distance until, at a great enough distance, indicated by notional boundary 3, it settles down to a stable shape. At greater distances the shape remains the same but the amplitude decreases inversely proportional to the distance in accordance with the law of conservation of energy. The region 4 where the signature shape does not change significantly with distance is known as the "far field" of the array 5 and it exists at distance greater than about $D^2/\lambda$ where D is the dimension of the array, and $\lambda$ is the wavelength. In FIG. 1, the "near field" region is indicated at 6 and the sea surface at 7.

The geophysical problem is to determine the "far field" signature as a fuction of direction. Measurements of the signature normally have to made in deep water e.g. off the continental shelf, to eliminate sea bottom reflection, and it is extremely difficult to determine the relative positions of the array and the measuring device with any precision. Consequently, it is desirable to be able to calculate the signature from the sum of the individual point source signatures. In the past this has not been possible due to inter-element inter actions.

The elements of any array do not behave independently when they are used together. The behaviour of each element is modified by the other elements. These modifications due to inter-element interaction have been recognised for years and their occurence was deduced by experiment in the following way. If there were no interactions, the far field signature of the array could be calculated by superposing the measured signatures of the individual elements. It has often been noticed that such calculated signatures do not match the measured far field signatures. It follows that the law of superposition does not apply. Therefore the elements do not behave indenpendtly. Therefore there is some inter-element interaction.

This interaction effect has not been well understood. Thus, it has not been posible to calculate the far field signature of an array in any direction or to measure it in all the required directions. In practice, the far field signature has usually been measured in deep water in only one direction, namely the vertical. In production, on the continental shelf, variations in signature shape due to variations in direction or variations in conditions have been ignored because it has been impossible to allow for them.

According to the present invention there is provided a method of determining the signature of an array of n seismic sources, comprising actuating the array of seismic sources, measuring the emitted pressure wave at n independent points whose positions are known with respect to the array, processing the measurements so as to produce n equivalent signatures of the n sources taking into account the interactions therebetween, and providing the signature of the array by superposing the n equivalent signatures.

According to another aspect of the invention, there is provided an array of seismic sources whose signature has been determined by a method according to the invention.

Thus, the signature may be found by means of "near field" measurements made close to each individual source element of the array. The measurements are then subjected to an analysis which takes the inter-element interactions into account and permits the signature to be calculated at any distance and in any direction.

According to yet another aspect of the invention, there is provided use of an array of seismic sources whose signature has been determined by a method according to the invention.

The invention will be further described, by way of example, with reference to FIGS. 2 to 6 of the accompanying drawings, in which.

The inter-element interaction of an array of seismic sources will be considered in relation to the use of air guns as the seismic sources. This is partly because air guns are the most commonly used marine seismic source, and partly because the oscillating bubble emitted by an air gun is susceptible to analysis which is easy to picture. Nevertheless, the interaction to be described is in principle the same for all marine "point" seismic sources and this technique can be applied very widely.

An air gun consists of a chamber containing air at high pressure which is suddenly opened. The escaping air forms a bubble which rapidly expands agaisnt the water, As it expands, the pressure in the bubble drops, and even drops to below the hydrostatic pressure of the water, for the inertia of the moving water carries the expansion through this equilibrium position. The expansion slows down and stops. The bubble then collaspses, overshooting the equilibrium position again while the pressure inside increases. The collapse of the bubble is halted by the rapid internal pressure build-up and, at this point, the oscillation is ready to begin again. The oscillating bubble is the generator of a seismic wave and, because the diameter of the bubble is always small compared with the seismic wavelengths, this wave has spherical symmetry at seismic frequencies. The shape of the pressure wave generated by the bubble is the same at all distances from the bubble, but its amplitude is inversely proportional to the distance.

The driving mechanism behind this oscillation is the pressure difference between the pressue $P_i$ inside the bubble and the pressure of the water, which is simply hydrostatic pressure $P_h$. The hydrostatic pressure remains virtually constant throughout the oscillation because the movement of the buoyant bubble towards the surface is very slow. The internal pressure varies with time. The driving pressure $P_d$ is thus time-variant:

$$P_d(t) = P_i(t) - P_h \qquad (1)$$

Figure 1:
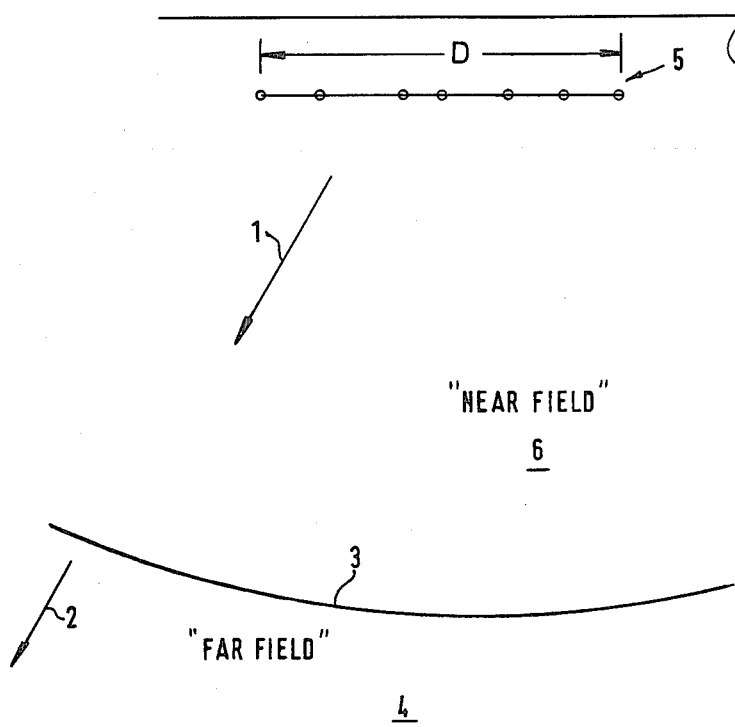
Figure 2:
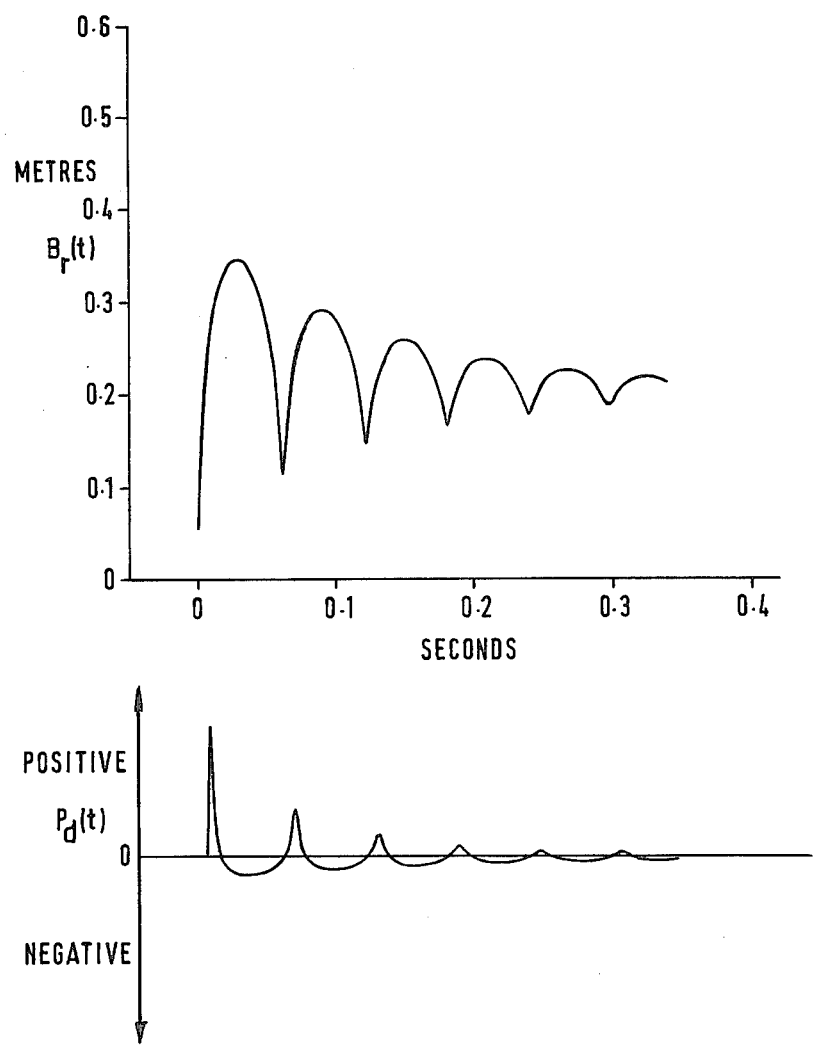
FIG. 2 shows graphs against a common time axis of radius $B_r(t)$ and pressure $P_d(t)$ of a bubble produced by an air gun.

As illustrated in FIG. 2, if $P_d(t)$ is positive, it is tending to make the bubble expand (or slow down the collapse). If $P_d(t)$ is negative, it is tending to make the bubble collapse (or the slow down the expansion). (See FIG. 2).

The pressure wave generated by this bubble has spherical symmetry, has amplitude which decays inversely with the distance r, and travels at the speed of sound in water c. At a distance r the transmitted wave would be:

$$\frac{1}{r} \cdot p\left(t - \frac{r}{c}\right)$$

where the time origin has been chosen to take account of the finite size of the bubble, as if the wave had originated at a point in the centre of the bubble.

An array comprising two air guns will now be considered. If the guns were fired independently, the driving pressure at the first gun would be:

$$P_{d1}(t) = P_{i1}(t) - P_{h1}, \qquad (2)$$

and the driving pressure at the second gun would be:

$$P_{d2}(t) = P_{i2}(t) - P_{h2} \qquad (3)$$

When they are fired together, each one is sensitive to the seismic waves generated by the other. The reason is that the pressure exerted by the water at each gun can no longer be considered constant. Primes are used hereinafter to indicate the behaviour when there is interaction.

Figure 3:
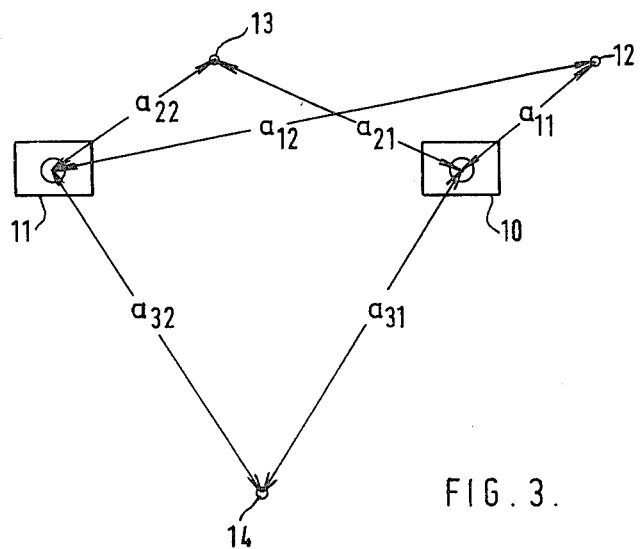
FIG. 3 illustrates an arrangement which may be used to perform a preferred method.

The behaviour of the bubble produced by the first gun 10 of FIG. 3 will be considered. At some instant in time t the hydrostatic pressure would be $P_{h1}$ in the absence of any influence from the second gun 11. But the gun 11 produced a bubble which oscillates and generates a semismic wave. This wave goes past the bubble at the gun 10. At time t there will be a pressure difference between one side of the bubble and the other, but this pressure difference is discernible only when wavelenghts of the size of the bubble diameter or smaller are considered. At longer wavelengths, the bubble appears to be a point and the modifying pressure is:

$$\frac{1}{r_{12}} p_2'\left(t - \frac{r_{12}}{c}\right),$$

where $P_2'$ is the sound wave generated by the bubble formed by the gun 11 and $r_{12}$ is the distance between the two guns. The hydrostatic pressure at the gun 10 at time t is therefore:

$$P'_{h1}(t) = P_{h1} + \frac{1}{r_{12}} p_2'\left(t - \frac{r_{12}}{c}\right) \qquad (4)$$

The driving pressure at the gun 10 is equal to the difference between the internal pressure and hydrostatic pressure, and this is:

$$P'_{d1}(t) = P'_{i1}(t) - P'_{h1}(t) \qquad (5)$$

Because the pressure difference at time t is not the same when the influence of the gun 11 is considered, the dynamics of the oscillating bubble change. The rate of expansion and collapse are different and the internal pressure $P_{i1}(t)$ at time t in the absence of the gun 11 will be different from the internal pressure $P'_{i1}(t)$ at time t when the influence of the gun 11 is taken into account. It follows that the seismic wave $P'_1(t)$ generated by the bubble of the gun 10 under the influence of the gun 11 will not be the same as the wave $P_1(t)$ generated when the gun 11 is absent. From equation (4), the interaction between the gun is inversely proportional to the distance between them. Also, the interaction effect depends on the relative firing times of the two guns. Since this is something which may vary from shot to shot in production, and cannot always be maintained exactly constant, changes in the signal shape would be expected. If the relative time delays are small these changes should not be noticeable at the frequencies of interest.

The bubble at the gun 10 will not change greatly in size under the influence of this interaction. It will still be small compared with the seismic wavelenghts. Therefore the wave generated by this bubble with its modified behaviour sill still have sperical symmetry, but will have a different signature. The signature will now be $P'_1(t)$ as opposed to $P_1(t)$ in the absence of any interaction. An idea of the modified behaviour of the gun 10 can be obtained by combining equations (4) and (5):

$$P'_{d1}(t) = P'_{i1}(t) - P_{h1} - \frac{1}{r_{12}} p_2'\left(t - \frac{r_{12}}{c}\right) \qquad (6)$$

which may be rewritten as follows:

$$P'_{d1}(t) = \left[P'_{i1}(t) - \frac{1}{r_{12}} \cdot p'_2\left(t - \frac{r_{12}}{c}\right)\right] - P_{h1} \qquad (7)$$

Comparing equations (6) and (7) the modified bubble at the gun 10 behaves as if its internal pressure at time t $$P'_{l2}(t) - \frac{1}{r_{12}} p'_2\left(t - \frac{r_{12}}{c}\right)$$

while the pressure exerted by the water appears to be static. The radiation from this modified bubble has spherical symmetry and a signature $p'_1(t)$, as described above. Similarly, the behaviour of the bubble at the gun 11 is modified by the influence of the gun 10. The bubble at the gun 11 behaves as if its internal pressure were:

$$P'_{l2}(t) - \frac{1}{r_{21}} p'_1\left(t - \frac{r_{21}}{c}\right)$$

while the pressure exerted by the water appears to be static. The net result is that its signature becomes $p'_2(t)$ ($r_{12}=r_{21}$ of course).

$P'_{l1}(t)$ and $P'_{l2}(t)$ are not know but that does not matter. The main point is that the interacting bubbles have been described in such a way that they are now equivalent to two independent bubbles with modified signatures $p'_1(t)$ and $p'_2(t)$. The interaction effects have been taken into account by the device of the rearrangement of equation (6) into equation (7). This simulates a notional bubble which produces the same radiation as the real bubble. Furthermore, since the national bubble drives against a constant hydrostatic pressure (see equation (7)), the interaction effects have been fully taken into account, and simple superposition of the signatures may thus be performed.

For example, FIG. 3 shows a first hydrophone 12 placed at a distance $a_{11}$ from the gun 10 and a distance $a_{12}$ from the gun 11. The signal that this hydrophone would measure is simply:

$$\frac{h_1}{s_1}(t) = \frac{1}{a_{11}} \cdot p'_1\left(t - \frac{a_{21}}{c}\right) + \frac{1}{a_{12}} p'_2\left(t - \frac{a_{12}}{c}\right) \quad (8)$$

A second hydrophone 13 located at distance $a_{21}$ and $a_{22}$ from the guns 10 and 11, respectively, would measure $$\frac{h_2}{s_2}(t) = \frac{1}{a_{21}} \cdot p'_1\left(t - \frac{a_{21}}{c}\right) + \frac{1}{a_{22}} p'_2\left(t - \frac{a_{22}}{c}\right) \quad (9)$$

In these equations $h_1(t)$ and $h_2(t)$ are the outputs of the hydrophones and $s_1$ and $s_2$ are their sensitivities.

If the geometry (that is, the distances $a_{11}$, $a_{12}$, $a_{21}$, $a_{22}$) and the hydrophone sensitivities are known, it is possible in principle to solve these last two equations for the signatures $p'_1(t)$ and $P'_2(t)$. In other words with two hydrophones of known sensitivity in a known geometrical relationship to the two guns, the signatures of the two equivalent non-interacting guns can be found. From these two signatures, the signature at a third hydrophone 14 located at distances $a_{31}$ and $a_{32}$ from the guns 10 and 11, respectively, is found to be:

$$h_3(t) = s_3\left(\frac{1}{a_{31}} \cdot p'_1\left(t - \frac{a_{31}}{c}\right) + \frac{1}{a_{32}} \cdot p'_2\left(t - \frac{a_{32}}{c}\right)\right) \quad (10)$$

The position of the third hydrophone could be chosen to be anywhere. In other words, the signature can be calculated anywhere in the water provided these essential measurements are made.

If there are n source elements in an array, it is necessary to have at least n calibrated hydrophones nearby, in a known geometrical relationship to the source elements. From the n independent measurements, n simultaneous equations can be formed and solved for the n equivalent source signatures. From these equivalent source signatures, the signature anywhere in the water can be calculated. This includes the ability to calculate the far field signature in any direction.

In general, the signature of a marine seismic source array, consisting of n point source elements can be determined at any point in the water. A preferred method comprises:
(a) measuring the pressure wave emitted by the seismic source array at n independent points, using calibrated pressure-sensitive detectors in a known geometrical relationship to the n source elements of the array, and to the sea surface;
(b) subjecting these measurements to analysis and comparison; and
(c) from the n computed equivalent point-source signatures, calculating the signature of the array of sources at any point in the water by simple superposition of these equivalent spherical waves.

In practice, the positioning of the n independent pressure-sensitive detectors is not entirely arbitrary. For example, if they were all placed in the far field and no two were more than half a wavelength from each other, there would be very little difference between the measurements, except at high frequencies outside the band of interest. In the band of interest, they would appear to be identical measurements.

In order to obtain measurements from which a meaningful solution can be obtained, it is sensible to position the n pressure sensitive detectors as close to the n corresponding source elements as possible, but they must not be too close. For example, in the case where the source elements are air guns, the detectors must not be placed so close that they become enveloped by the bubbles and are thus made unable to measure the pressure field in the water. For guns up to 300 cu. ins. at normal pressure (2000 psi) and depths (greater than about 3 meters), the hydrophones should be no closer than about 1 meter.

With this sort of arrangement it is possible to solve the equations and determine the signature at any arbitrary point as described hereinafter.

If there is any energy loss at the sea surface and the reflection coefficient R cannot be considered constant, the virtual sources have to be treated as independent point sources, in which case it is necessary to make 2n independent measurements of the pressure field in the vicinity of the array.

Figure 4:
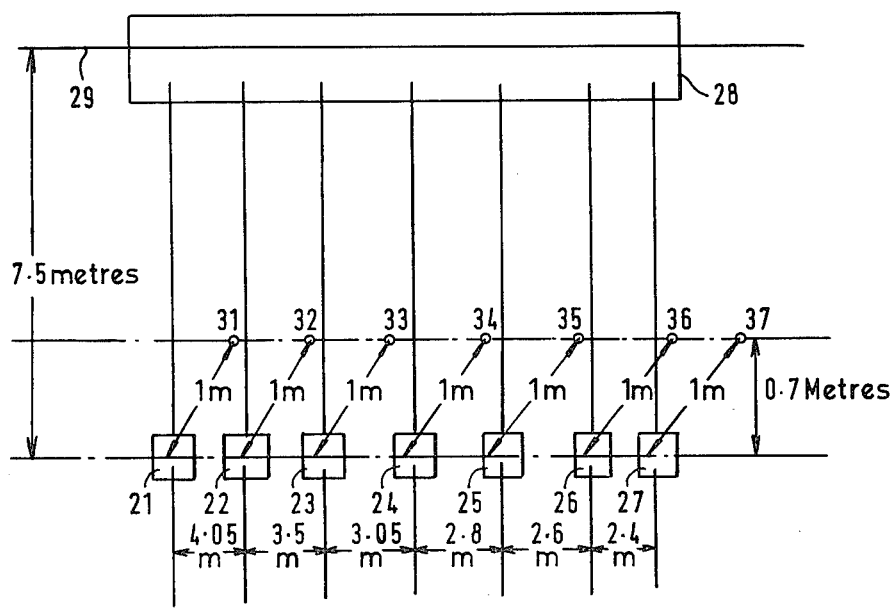
FIG. 4 shows another arrangement which may be used to perform a preferred method.

FIG. 4 shows an experimental set-up used for testing a preferred method and comprising an array of seven air guns 21 to 27 of different sizes suspended from a buoy 28 at 7.5 meters below the sear surface 29. The guns 22 and 24 are switched off, and the guns 21, 23, 25, 26 and 27 are fired simultaneously. The guns 21 to 27 have volumes in cubic inches of 305, 200, 125, 95, 75, 60 and 50, respectively, (in liters, approximately 5, 3.28, 2.05, 1.56, 1.23, 0.98, and 0.82, respectivley, and are spaced apart by the distance shown in FIG. 4. Seven hydrophones 31 to 37 are located 0.7 meters above the guns with each hydrophone being spaced from a respective one of the guns be 1 meter, as indicated in FIG. 4, which is not to scale.

Using the hydrophone 31, 33, 35, 36 and 37 it is possible to find a solution of the equations (A1) described hereinafter, which will consist of 5 equivalent "notional" source signatures $P'_1(t)$, $P'_3(t)$, $P'_5(t)$, $P'_6(t)$, $P'_7(t)$, and to complete the signature at any other point in the water using equation (A2).

Figure 5:
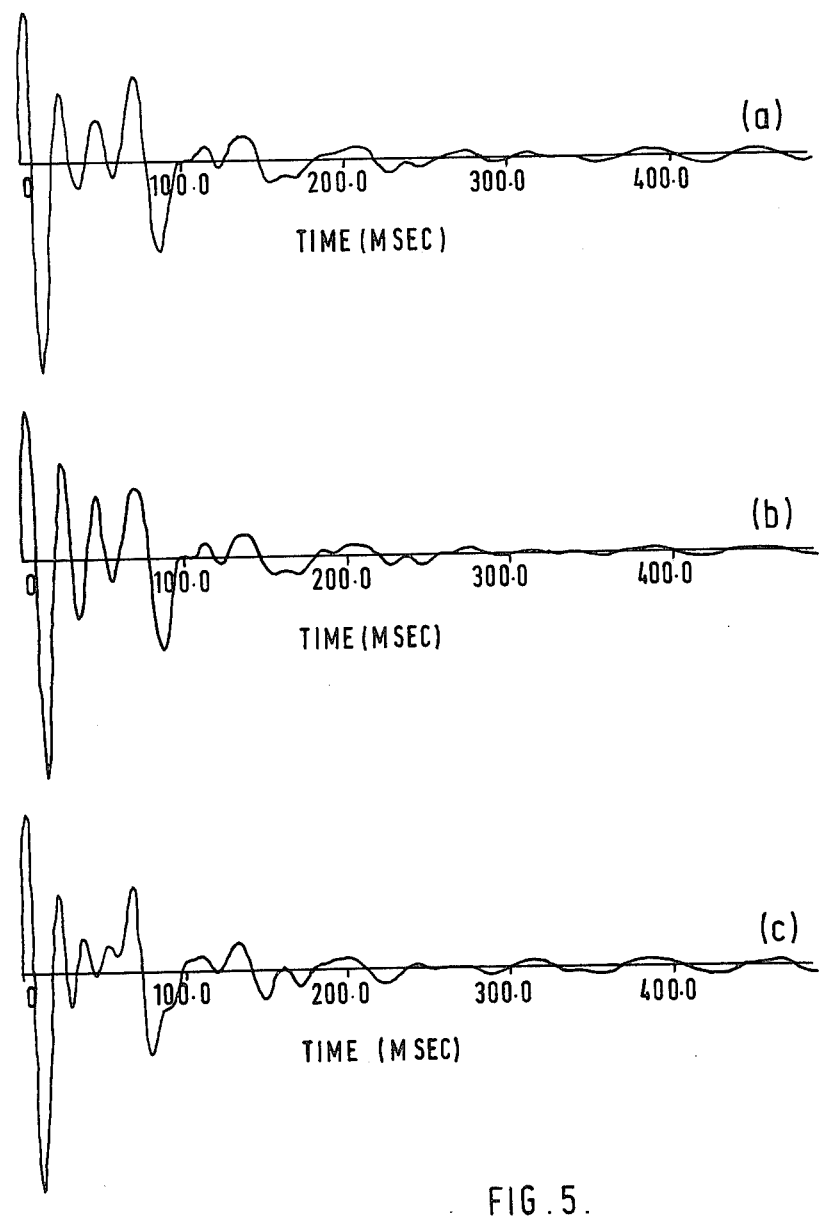
FIG. 5 illustrates measurements obtained by a preferred method and by a known method.

A test of a preferred method was made to see whether the predicted wave at a point, including the interaction, would match the wave measured at that point. Two independent measurements are provided at the hydrophones 32 and 34. FIG. 5(b) shows the waveform measured during this experiment at the hydrophone 34. The measurement has been filtered to remove high frequency information in excess of 60Hz as the interaction is a predominately low-frequency phenomenon. FIG. 5(a) shows the waveform calculated by including the interaction as described above. FIG. 5(c) is the waveform which is computed by superposing the non-interacting signatures $P_1(t)$, $P_3(t)$, $P_5(t)$, $P_6(t)$ and $P_7(t)$ which are obtained by firing each gun separately.

Figure 6:
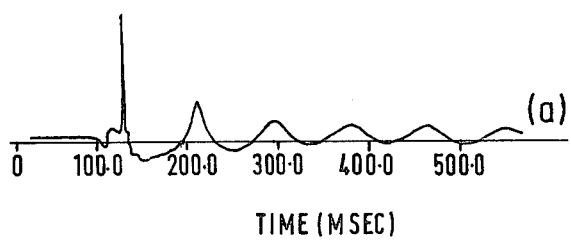
FIG. 6 shows signatures corresponding to a single seismic air gun and an array of such guns.
Figure 6:
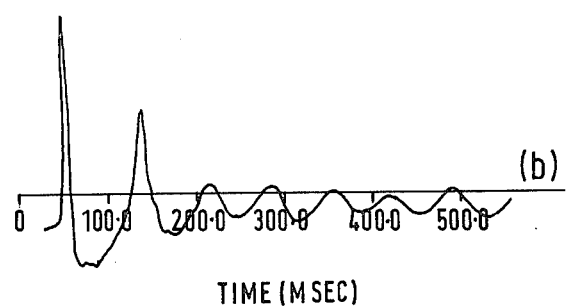

FIG. 6(a) shows the signature at the hydrophone 33 when only the gun 23 is firing. FIG. 6(b) shows the signature at the same hydrophone when all seven guns are firing. The differences between these two signatures are due to the interaction effects described hereinbefore.

The agreement between the solution shown in FIG. 5(a) with the measurement shown in FIG. 5(b) is far better than the agreement between solution shown in FIG. 5(c) and the measurement shown in FIG. 5(b).

This test was carried out with slightly imperfect knowledge of the hydrophone sensitivities and of the geometry. With more precise knowledge of these essential parameters the solution would be expected to be even better. The degree of interaction in this particular experiment is not high—the solution (c) obtained by ignoring it is not very bad. But when all seven guns are firing it will be greater, and in this situation, which is the normal one, the solution would be expected to be just as accurate, and would enable the far field signature to be computed in any direction, as required.

An array of n interacting marine seismic sources will be considered and, for the moment, the presence of the sea surface will be neglected. n calibrated independent hydrophones are positioned in a known geometrical relationship to the n source elements such that the distances $a_{ij}$ between the ith hydrophone and the jth source are known for all n hydrophones and all n sources.

In the absence of the other elements, the jth source element emits a spherical pressure wave $p_j(t)$, such that at some distance r from the source the signature is $$\frac{1}{r} p_j\left(t - \frac{r}{c}\right).$$

In the presence of the other sources, the contribution to the pressure field at a distance r from this jth point source is $$\frac{1}{r} p'_j\left(t - \frac{r}{c}\right),$$

where the prime indicates the interaction, and p'(t) is a "national" spherical wave based on the same reasoning as described above. At the ith hydrophone the measured signal will be the sum of all such contributions:

$$h_i(t) = s_i \sum_{j=1}^{n} \frac{1}{a_{ij}} \cdot p'_j\left(t - \frac{a_{ij}}{c}\right), \tag{A1}$$

$$i = 1, 2, \ldots, n$$

where $s_i$ is the sensitivity of the ith hydrophone. Since there are n such hydrophones, there are n simultaneous equations (A1) which can be solved for the n unknowns $p'_j(t)$, $J = 1, 2, \ldots n$.

From the n notional spherical source waves $p'_j(t)$, $j = 1, 2, \ldots, n$, the pressure field at any point in the water can be computed by the superposition of all the contributions:

$$p(t) = \sum_{j=1}^{n} \frac{1}{r_j} p'_j\left(t - \frac{r_j}{c}\right), \tag{A2}$$

where $r_j$ is the distance from the jth source to the desired point.

The sea surface can be considered to be a plane reflector, and the reflected waves from the notional point seismic sources appear to come form virtual point seismic sources. Let the spherical waves generated by these virtual sources be $g_j(t)$ where $g_j(t)$ is the reflection of $p_j(t)$ for all j. If $b_{ij}$ is the distance from the ith hydrophone to the jth virtual source, the total measured signal at the ith hydrophone will be:

$$h_i(t) = s_i \sum_{j=1}^{n} \left( \frac{1}{a_{ij}} \cdot p'_j\left(t - \frac{a_{ij}}{c}\right) + \frac{1}{b_{ij}} \cdot q_j\left(t - \frac{b_{ij}}{c}\right) \right) \tag{A3}$$

Very often the reflection coefficient R of the sea surface can be considered to be constant, such that $$q_j(t) = R \cdot p_j(t), \tag{A4}$$

with R normally close to $-1$. Provided all the distances $b_{ij}$ are known, equations (A3) are still n simultaneous equations containing n unknowns.

However it is possible that the amplitude of the incident wave at the sea surface can exceed one atmosphere. In this case the reflection coefficient will not be equal to $-1$, as there will be some energy loss: the sea surface will be lifted up, and the energy required for this will not be available to the reflected wave. This effect of reduced reflection amplitude will occur for the biggest peaks of the incident wave at the sea surface, and will be more likely to occur when the array is shallow than when it is deep. If such peaks are truncated, the reflected waves will be distorted and equations (A4)

will not be valid. The n virtual point sources can then be considered to be independent of the real sources, and can be described simply as $$p'_k(t) = q_j(t), \qquad (A5)$$

where $k = n+j$, for $j = 1, 2, \ldots, n$. If equations (A5) are substituted into equations (A3), making the further substitutions $$a_{ik} = b_{ij} \qquad (A6)$$

where $k = n+j$, for $j = 1, 2, \ldots, n$, then:

$$h_i(t) = s_i \sum_{j=1}^{2n} \left( \frac{1}{a_{ij}} \cdot p'_j \left( t - \frac{a_{ij}}{c} \right) \right), \qquad (A7)$$

for $i = 1, 2, \ldots, n$.

Thus, there are 2n unknowns and only n equations, which cannot be solved. The way to solve the problem is to find n more independent equations; that is, to provide n more measurements with n more calibrated hydrophones. Thus, with n sources and n virtual sources, the interaction problem can be solved provided there are 2n independent measurements. The equations which need to be solved are:

$$h_i(t) = s_i \sum_{j=1}^{2n} \left( \frac{1}{a_{ij}} \cdot p'_j \left( t - \frac{a_{ij}}{c} \right) \right), \qquad (A8)$$

for $i = 1, 2, \ldots, 2n$.

These 2n simulataneous equations can be solved by standard methods.

In production the marine seismic source array are normally towed behind the survey vessel at a constant distance. The n sources and n hydrophones are arranged in a harness towed at a constant depth below the sea surface.

In the case where these sources are air guns, the bubbles formed by the guns will tend to remain in position as the harness containing the guns and hydrophones is towed through the water. The distance from any bubble to any hydrophone will not remain constant. Thus in equation (A1) and subsequent equations, the quantities $a_{ij}$ and $b_{ij}$ must be considered to be functions of time. For example, if there is a relative closing velocity $v_{ij}$ between the ith hydrophone and jth gun, then $$a_{ij}(t) = a_{ij}(o) - v_{ij} t, \qquad (A9)$$

where $a_{ij}(o)$ is the distance between the ith hydrophone and the jth gun at the time the gun is fired: that is, when $t = 0$. This distance is known of course, but $v_{ij}$ is not known, though perhaps it can be guessed.

This velocity term could cause difficulties with the above-described method unless the parameters controlling the behaviour of individual guns and the interaction between them are constant and independent of velocity. In the case of air guns, for example, the paramaters which fully determine the behaviour of any individual air bubble are:
1. the volume of the gun
2. the firing pressure of the gun
3. the depth of the gun below the sea surface.

The parameters which control the interaction between the guns are:
1. the relative firing times of the guns
2. the relative geometrical configuration of the guns to each other.

If all these parameters can be maintained effectively constant from shot to shot then the seismic radiation produced by the array will not vary.

In order to determine the seismic radiation by the above method, all the relative velocity terms must be known or must be eliminated. For instance, the source array is fired when the ship is not moving relative to the water and the equations are solved to determine the equivalent notional source signatures. Provided none of the crucial parameters changes significantly when the ship is moving, the notional source signatures will remain constant.

In practice the volumes and geometrical configuration of the guns will remain fixed. The firing pressure is normally around 2000±100 p.s.i.g. This 5% error in the pressure produces errors of about 2% in the bubble oscillation period, which are acceptable. The relative firing times can normally be held constant to within ±2 ins which is also a acceptable. Variations in the depth affect both the onset time of the sea surface reflection and the behavour of the bubbles. In practice the depth needs to be maintained constant to approximately ±0.3 m.

If these parameters cannot be maintained constant within these limits, there will be variations in the seismic radiation. These variations become noticeable at high frequencies first and progress towards the low frequencies as the variations increase in magnitude. Thus the variations control the frequency bandwidth over which the above-described method may be used.

We claim:

1. A method of determining the signature of an array of n seismic sources, comprising the steps of:
   providing an array of n marine seismic sources as the array of n seismic sources, and providing n hydrophones for measuring the emitted pressure wave;
   actuating the array of n seismic sources;
   measuring the emitted pressure wave at n independent points whose positions are known with respect to the array;
   processing the measurements so as to produce n equivalent signatures of the n sources taking into account the interactions therebetween, said processing step comprising
   forming n simultaneous equations $$h_i(t) = S_i \sum_{j=1}^{n} \frac{1}{a_{ij}} P'_j \left( t - \frac{a_{ij}}{c} \right)$$

$$i = 1, 2, \ldots, n,$$

where $h_i(t)$ is the signal provided by the i th hydrophones, $S_i$ is the sensitivity of the i th hydrophone, $a_{ij}$ is the distance between the i th hydrophone and the j th seismic source, c is the speed of sound in water, t is time, and $P'_j(t)$ is the equivalent signature of the j th seismic source, and
   solving the n simultaneous equations for $P'_{j(t)}$ where $j = 1, 2, \ldots, n$; and
   providing the signature of the array by superposing the n equivalent signatures.

2. A method as set forth in claim 1, wherein each of the marine seismic sources is provided as an air gun.

3. A method as set forth in claim 2, comprising the further step of locating each hydrophone adjacent a respective one of the air guns but spaced therefrom by a distance such that the hydrophone does not penetrate the air bubble produced by the air gun.

4. A method as set forth in claim 1, wherein said step of providing the signature of the array comprises forming the signature P (t) of the array at any predetermined point by superposing the n equivalent signatures according to:

$$P(t) = \sum_{j=1}^{n} \frac{1}{r_j} P_j\left(t - \frac{r_j}{c}\right)$$

where $r_j$ is the distance from the j th source to the predetermined point.

5. An array of seismic sources whose signature has been determined by a method as set forth in claim 1.

6. Use of said array of seismic sources as set forth in claim 5 for collecting data.

7. Data collected by said use of said array of seismic sources as set forth in claim 6.

8. A method of determining the signature of an array of n seismic sources, comprising the steps of:

providing an array of n marine seismic sources as the array of n seismic sources, and providing n hydrophones for measuring the emitted pressure wave;

actuating the array of n seismic sources;

measuring the emitted pressure wave at n independent points whose positions are known with respect to the array;

processing the measurements so as to produce n equivalent signatures of the n sources taking into account the interactions therebetween, said processing step comprising forming n simultaneous equations $$h_i(t) = S_i \sum_{j=1}^{n} \frac{1}{a_{ij}} P_j\left(t - \frac{a_{ij}}{c}\right) + \frac{1}{b_{ij}} q'_j\left(t - \frac{b_{ij}}{c}\right)$$

$i = 1, 2, \ldots, n,$ where $h_i(t)$ is the signal provided by the i th hydrophone, $S_i$ is the sensitivity of the i th hudrophone, $a_{ij}$ is the distance between the i th hydophone and the j th seismic source, c is the speed of sound in water, t is time, $P'_j(t)$ is the equivalent signature of the j th seismic source, $o'_j(t)$ is the equvalent signature of a virtual seismic source corresponding the j th seismic source and formed by relfection at the sea surface, $b_{ij}$ is the distance from the i th hydrophone to the j th virtual source, $q'_j(t) = R \cdot P'_j(t)$, R is the coefficient of reflection of the sea surface, and the amplitude of the pressure wave at the sea surface does not exceed atmospheric pressure, and solving the n simultaneous equations for $P'_j(t)$ where $i = 1, 2, \ldots, n$; and providing the signature of the array by superposing the n equivalent signatures.

9. A method as set forth in claim 8, wherein each of the marine seismic sources is provided as an air gun.

10. A method as set forth in claim 9, comprising the further step of locating each hydrophone adjacent a respective one of the air guns but spaced therefrom by a distance such that the hydrophone does not penetrate the air bubble produced by the air gun.

11. A method as set forth in claim 8, wherein said step of providing the signature of the array comprises forming the signature P (t) of the array at any predetermined point by superposing the n equivalent signatures according to:

$$P(t) = \sum_{j=1}^{n} \frac{1}{r_j} P_j\left(t - \frac{r_j}{c}\right)$$

where $r_j$ is the distance from the j th source to the predetermined point.

12. An array of seismic sources whose signature has been determined by a method as set forth in claim 8.

13. Use of said array of seismic sources as set forth in claim 12 for collecting data.

14. Data collected by said use of said array of seismic sources as set forth in claim 13.

15. A method of determining the signature of an array of n seismic sources, comprising the step of:

providing an array of n marine seismic sources as the array of n seismic sources, and providing 2n hydrophones for measuring the emitted pressure wave, the amplitude of which pressure wave exceeds atmospheric pressure at the sea surface;

actuating the array of n seismic sources;

measuring the emitted pressure wave at n independent points whose positions are known with respect to the array;

processing the measurements so as to produce n equivalent signatures of the n sources taking into account the interactions therebetween, said processing step comprising forming 2n simultaneous equations $$h_i(t) = S_i \sum_{j=1}^{2n} \frac{1}{a_{ij}} P_j\left(t - \frac{a_{ij}}{c}\right)$$

$i = 1.2 \ldots, 2n,$ where $h_i(t)$ is the signal provided by the ith hydrophone, $S_i$ is the sensitivity of the i th hydrophone, $a_{ij}$ is the distance between the i th hydrophone and the j th seismic source, c is the speed of sound in water, t is time, $P'_k(t)$ for $j = 1, 2, \ldots, n$ is the equivalent signature of the j th seismic source, and $P'_j(t)$ for $j = n+1, \ldots, 2n$ is the equivalent signature of a virtual seismic source corresponding to the (j−n) th seismic source and formed by relfection in the sea surface, and solving the 2n simultaneous equations for $P'_j(t)$ where $j = 1, 2, \ldots, 2n$; and, providing the signature of the array by superposing the n equivalent signatures, said providing step comprising forming the signature P (t) of the array at any predetermined point by superposing the 2u equivalent signatures according to $$P(t) = \sum_{j=1}^{2n} \frac{1}{r_j} P_j\left(t - \frac{r_j}{c}\right)$$

where $r_j$ is the distance from the j th seismic source and virtual source to the predetermined point.

16. An array of seismic sources whose signature has been determined by a method as set forth in claim 15.

17. Use of said array of seismic sources as set forth in claim 16 for collecting data.

18. Data collected by said use of said array of seismic sources as set forth in claim 17.

19. A method of determining the signature of an array of n seismic sources, comprising the steps of:
actuating the array of n seismic sources;
measuring the emitted pressure wave in the near field of the array at n independent points whose positions are known with respect to the n seismic sources;
processing the measurements by taking into account the interactions between the n sources so as to construct at least notionally an equivalent array of n non-interacting independent sources having n equivalent signatures which are superposable to provide the signature of the array; and
determining the signature of the array by superposing the n equivalent signatures.

20. A method as set forth in claim 19, comprising the further steps of providing an array of n marine seismic sources as the array of n seismic sources, and providing n hydrophones for measuring the emitted pressure wave.

21. A method as set forth in claim 20, wherein each of the marine seismic sources is provided as an air gun.

22. A method as set forth in claim 18, comprising the further step of locating each hydrophone adjacent a respective one of the air guns but spaced therefrom by a distance such that the hydrophone does not penetrate the air bubble produced by the air gun.

23. A method as set forth in claim 19, wherein said processing step comprises:
forming n simultaneous equations $$h_i(t) = S_i \sum_{j=1}^{n} \frac{1}{a_{ij}} P_j'\left(t - \frac{a_{ij}}{c}\right)$$

$i = 1, 2, \ldots, n,$ where $h_i(t)$ is the signal provided by the i th hydrophone, $S_i$ is the sensitivity of the i th hydrophone, $a_{ij}$ is the distance between the i th hydrophone and the j th seismic source, c is the speed of sound in water, t is time, and $P_j'(t)$ is the equivalent signature of the j th seismic source; and
solving the n simultaneous equations for $P_j'(t)$ where $j = 1, 2, \ldots, n$.

24. A method as set forth in claim 17, wherein said processing step comprises:
forming n simultaneous equations $$h_i(t) = S_i \sum_{j=1}^{n} \frac{1}{a_{ij}} P_j'\left(t - \frac{a_{ij}}{c}\right) + \frac{1}{b_{ij}} q_j'\left(t - \frac{b_{ij}}{c}\right)$$

$i = 1, 2, \ldots, n,$ where $h_i(t)$ is the signal provided by the i th hydrophone, $S_i$ is the sensitivity of the i th hydrophone, $a_{ij}$ is the distance between the i th hydrophone and the j th seismic source, c is the speed of sound in water, t is time, $P_j'(t)$ is the equivalent signature of the j th seismic source, $q_j'(t)$ is the equivalent signature of a virtual seismic source correspondiang to the j th seismic source and formed by reflection at the sea surface, $b_{ij}$ is the distance from the i th hydrophone to the j th virtual source, $q_j'(t) = R \cdot P_j'(8t)$, R is the coefficient of reflection of the sea surface, and the amplitude of the pressure wave at the sea surface does not exceed atmospheric pressure; and
solving the n simultaneous equations for $P_j'(t)$ where $i = 1, 2, \ldots, n$.

25. A method as set forth in claim 23, wherein said step of providiang the signature of the array comprises forming the signature P (t) of the array at any predetermined point by superposing the n equivalent signatures according to :

$$P(t) = \sum_{j=1}^{n} \frac{1}{r_j} P_j'\left(t - \frac{r_j}{c}\right)$$

where $r_j$ is the distance from the j th source to the predetermined point.

26. A method as set forth in claim 24, wherein said step of providing the signature of the array comprises forming the signature P (t) of the array at any predetermined point by superposing the n equivalent signatures according to:

$$P(t) = \sum_{j=1}^{n} \frac{1}{r_j} P_j'\left(t - \frac{r_j}{c}\right)$$

where $r_j$ is the distance from the j th source to the predetermined point.

27. A method as set forth in claim 20, comprising the further steps of providing an array of n marine seismic sources as the array of n seismic sources, and providing 2n hydrophones for measuring the emitted pressure wave, the amplitude of which pressure wave exceeds atmospheric pressure at the sea surface.

28. A method as set forth in claim 27, wherein said processing step comprises:
forming 2n simultaneous equations $$h_i(t) = S_i \sum_{j=1}^{2n} \frac{1}{a_{ij}} P_j'\left(t - \frac{a_{ij}}{c}\right)$$

$i = 1.2 \ldots, 2n,$ where $h_i(t)$ is the signal provided by the ith hydrophone, $S_i$ is the sensitivity of the i th hydrophone, $a_{ij}$ is the distance between the i th hydrophone and the j th seismic source, c is the speed of sound in water, t is time, $P_k'(t)$ for $j = 1, 2, \ldots, n$ is the equivalent signature of the j th seismic source, and $P_j'(t)$ for $j = n+1, \ldots, 2n$ is the equivalent signature of a virtual seismic source corresponding to the (j−n) th seismic source and formed by reflection in the sea surface; and
solving the 2n simultaneous equations for $P_j'(t)$ where $j = 1, 2, \ldots, 2n$.

29. A method as set forth in claim 28, wherein said step of providing the signature of the array comprises forming the signature P (t) of the array at any predetermined point by superposing the 2u equivalent signatures according to $$P(t) = \sum_{j=1}^{2n} \frac{1}{r_j} P_j\left(t - \frac{r_j}{c}\right)$$

where $r_j$ is the distance from the j th seismic source and virtual source to the predetermined point.

30. An array of seismic sources whose signature has been determined by a method as set forth in claim 19.

31. Use of said array of seismic sources as set forth in claim 30 for collecting data.

32. Data colected by said use of said array of seismic sources as set forth in claim 31.

* * * * *

UNITED STATES PATENT AND TRADEMARK OFFICE
CERTIFICATE OF CORRECTION

PATENT NO. : 4,476,553

DATED : October 9, 1984

INVENTOR(S) : Ziolkowski et al.

It is certified that error appears in the above-identified patent and that said Letters Patent are hereby corrected as shown below:

Column 1, line 14, "aroustic" should read -- acoustic --.

Column 1, line 41, "distance" should read -- distances --.

Column 1, line 46, "fuction" should read -- function --.

Column 1, line 67, "indenpendtly" should read -- independently --.

Column 2, line 2, "posible" should read -- possible --.

Column 2, line 60, "agaisnt" should read -- against --.

Column 2, line 65, "collaspses" should read -- collapses --.

Column 3, line 23, "the" (first occurrence) should read -- to --.

Column 3, line 44, "(2)" should be moved out to the right hand margin.

Column 3, line 61, "semismic" should read -- seismic --.

Column 4, line 6, "$P_2$." should read -- $p'_2(t)$ --.

UNITED STATES PATENT AND TRADEMARK OFFICE
CERTIFICATE OF CORRECTION

PATENT NO. : 4,476,553

DATED : October 9, 1984

INVENTOR(S) : Ziolkowski et al.

It is certified that error appears in the above-identified patent and that said Letters Patent are hereby corrected as shown below:

Column 4, line 21, "$P_{dl}(t) = P_{il}(t) -- P_{hl}(t)$" should read -- $P'_{dl}(t) = P'_{il}(t) -- P'_{hl}(t)$ --.

Column 4, line 34, "gun" should read -- guns --.

Column 5, line 31, "national" should read -- notional --.

Column 5, line 47, "distance" should read -- distances --.

Column 5, line 61, "$P'_2(t)$" should read -- $p'_2(t)$ --.

Column 6, line 67, "sear" should read -- sea --.

Column 7, line 4, "respectivley" should read -- respectively --.

Column 8, line 10, "national" should read -- notional --.

Column 8, line 20, "$s_j$" should read -- $s_i$ --.

Column 8, line 23, "$J = 1$" should read -- $j = 1$ --.

UNITED STATES PATENT AND TRADEMARK OFFICE
CERTIFICATE OF CORRECTION

PATENT NO. : 4,476,553

DATED : October 9, 1984

INVENTOR(S) : Ziolkowski et al.

It is certified that error appears in the above-identified patent and that said Letters Patent are hereby corrected as shown below:

Column 9, line 37, "simulataneous" should read -- simultaneous --.

Column 10, lines 59-60, "hydrophones" should read -- hydrophone --.

Column 11, line 48, "hudrophone," should read -- hydrophone, --.

Column 11, line 49, "hydophone" should read -- hydrophone --.

Column 11, line 52, "equvalent" should read -- equivalent --.

Column 12, line 22, "step" should read -- steps --.

Column 13, line 29, "18" should read -- 21 --.

Column 13, line 34, "19" should read -- 20 --.

Column 13, line 44, "sensitivitly" should read -- sensitivity --.

Column 13, line 51, "17" should read -- 20 --.

Column 13, line 67, "correspondiang" should read -- corresponding --.

Column 14, line 3, "8t)" should read -- (t) --.

UNITED STATES PATENT AND TRADEMARK OFFICE
CERTIFICATE OF CORRECTION

PATENT NO.   :   4,476,553
DATED        :   October 9, 1984
INVENTOR(S)  :   Ziolkowski et al.

It is certified that error appears in the above—identified patent and that said Letters Patent are hereby corrected as shown below:

Column 14, line 11, "providiang" should read -- providing --.

Column 14, line 35, "20" should read -- 19 --.

Column 16, line 7, "colected" should read -- collected --.

Signed and Sealed this

Eighteenth Day of June 1985

[SEAL]

Attest:

DONALD J. QUIGG

Attesting Officer

Acting Commissioner of Patents and Trademarks